United States Patent
Liu et al.

(10) Patent No.: US 7,286,336 B2
(45) Date of Patent: Oct. 23, 2007

(54) PLASMA TREATMENT OF ANODIC OXIDES FOR ELECTROLYTIC CAPACITORS

(75) Inventors: Yanming Liu, Clarence Center, NY (US); Barry Muffoletto, Alden, NY (US); David Goad, Orchard Park, NY (US)

(73) Assignee: Greatbatch Ltd., Clarence, NY (US)

( * ) Notice: Subject to any disclaimer, the term of this patent is extended or adjusted under 35 U.S.C. 154(b) by 257 days.

(21) Appl. No.: 11/128,849

(22) Filed: May 13, 2005

(65) Prior Publication Data

US 2005/0254199 A1    Nov. 17, 2005

Related U.S. Application Data

(60) Provisional application No. 60/571,042, filed on May 14, 2004.

(51) Int. Cl.
*H01G 9/04* (2006.01)
(52) U.S. Cl. ............... 361/528; 361/523; 361/525; 361/529; 361/534; 29/25.01; 29/25.03
(58) Field of Classification Search ........... 361/523, 361/525, 528–534, 516–519; 29/25.01, 25.03
See application file for complete search history.

(56) References Cited

U.S. PATENT DOCUMENTS

| | | | |
|---|---|---|---|
| 3,457,614 A | 7/1969 | Tibol | |
| 5,062,900 A | 11/1991 | Berneron et al. | |
| 5,383,980 A | 1/1995 | Melber et al. | |
| 6,080,283 A | 6/2000 | Ray | |
| 6,143,598 A * | 11/2000 | Martin et al. | 438/240 |
| 6,231,993 B1 | 5/2001 | Stephenson et al. | |
| 6,254,844 B1 | 7/2001 | Takeuchi et al. | |
| 6,368,467 B1 | 4/2002 | Andrews et al. | |
| 6,426,861 B1 * | 7/2002 | Munshi | 361/312 |
| 6,515,847 B1 * | 2/2003 | Naraya | 361/523 |
| 6,551,742 B1 | 4/2003 | Huq et al. | |
| 6,865,071 B2 * | 3/2005 | Katsir et al. | 361/523 |
| 6,927,967 B2 * | 8/2005 | Tripp | 361/523 |
| 6,992,881 B2 * | 1/2006 | Reichert et al. | 361/528 |
| 2002/0076946 A1 * | 6/2002 | Kim et al. | 438/785 |

OTHER PUBLICATIONS

Electron Device Letters, vol. 23, No. 11, Nov. 2002-Improvement of Electrical and Reliability Properties of Tantalum Pentoxide by High-Density Plasma (HDP) Annealing in $N_2O$—Chang, Lee, Chen, Sun, Liu, Liaw and Huang.

* cited by examiner

*Primary Examiner*—Nguyen T. Ha
(74) *Attorney, Agent, or Firm*—Michael F. Scalise

(57) ABSTRACT

An oxygen plasma process for treating a dielectric oxide layer, particularly an anodic oxide, subsequent to its incorporation into an electrolytic capacitor is described. The present treatment reduces DC leakage and improves shelf life stability of the resulting capacitor in comparison to anodic oxides treated in a conventional manner. This is important for critical applications such as implantable cardioverter defibrillators where capacitor charging time and charge/discharge energy efficiency are critical.

19 Claims, 1 Drawing Sheet

Plasma Treatment of Value Metal Capacitor Anodes Provided With an Anodic Dielectric Oxide

PLASMA TREATMENT OF ANODIC OXIDES FOR ELECTROLYTIC CAPACITORS

CROSS-REFERENCE TO RELATED APPLICATION

This application claims priority to U.S. provisional patent application Ser. No. 60/571,042, filed May 14, 2004.

BACKGROUND OF THE INVENTION

1. Field of the Invention

The present invention is directed to a plasma process for treating a capacitor dielectric oxide, particularly the anodic oxide serving as the dielectric in an electrolytic capacitor. This treatment reduces the oxygen vacancy defects in the anodic dielectric oxide prior to incorporation of the formed (anodized) anode into the capacitor. Reduced oxygen deficiencies improve the capacitor's DC leakage as well as charge/discharge energy efficiency and long-term performance stability. These properties are important for critical applications such as implantable cardioverter defibrillators.

2. Prior Art

Electrolytic capacitors are well known for use in a variety of electronic equipment such as consumer audio and video equipment, home appliances, power supplies, industrial electronics, military electronics, computers, telecommunication equipment, entertainment equipment, automotive devices, lighting ballasts, and implantable medical devices. In general, electrolytic capacitors comprise an anode and a cathode segregated from each other by at least one layer of separator material impregnated with a working electrolyte. The anode is a valve metal body coated with a layer of the corresponding metal oxide serving as a dielectric.

The dielectric oxide in electrolytic capacitors is normally formed using a technique known as anodizing. Passing an anodic current through a valve metal immersed in an anodizing (formation) electrolyte does this. The thickness of the resulting anodic oxide is proportional to the anodizing voltage. The desired oxide thickness is determined by the capacitor rated voltage and other required properties. For a given dielectric oxide thickness, the volumetric capacitance and energy density of a capacitor are functions of the specific surface area of the valve metal anode. To increase capacitor volumetric energy density, a porous valve metal is normally used. Examples include an etched aluminum foil for an aluminum capacitor and pressed and sintered tantalum powder body for a tantalum capacitor.

The oxide quality formed by anodizing depends on a number of factors including purity of the valve metal, anode micromorphology, anode size and geometry, formation electrolyte composition, anodizing temperature, and anodizing protocols. Nonetheless, the formed oxide often contains defects due to oxygen vacancies and incorporated harmful species from the anodizing electrolytes. These adversely affect DC leakage and stability of the oxide layer.

It is undesirable for a capacitor to experience high DC leakage and oxide degradation for several reasons. For one, dielectric oxide degradation results in increased capacitor charging time, which is especially important when the capacitor is incorporated into an implantable medical device. An example is an implantable cardioverter defibrillator where the battery powers circuitry that monitors the heart. As long as the heart is beating in a normal rhythm, nothing more is needed. Heart monitoring is a relatively low energy requirement. From time to time, a tachyarrhythmia may be detected. This is an abnormally rapid heartbeat that if left uncorrected can be fatal. Upon detection of a tachyarrhythmia, the battery goes into a device activation mode where it rapidly charges the capacitor, which then dumps its load to shock the heart back into a normal beating rhythm.

In that respect, the capacitors in an implantable cardioverter defibrillator operate infrequently. While they are idle most of the time, once a tachyarrhythmia is detected, the capacitors need to be charged up quickly. But, oxide degradation results in increased capacitor charge time. Oxide degradation also decreases capacitor charge/discharge energy efficiency, which either decreases the useful life of the battery or increases battery and device volume. All these consequences are a result of defects in the anodic oxide film. The more imperfect the dielectric oxide, the longer the charge time is and the less efficient the charging and discharging.

Due to the oxide degradation, such as in an aluminum electrolytic capacitor used in an implantable cardioverter defibrillators, the capacitor must also be subjected to a so-called re-form procedure to recover the capacitor charging time by healing the degraded oxide therein. Charging the capacitor to or near its rated voltage normally does this. The charge is then emptied into a dummy circuit or allowed to slowly bleed off. Energy needed to reform the valve metal anode decreases the useful life of the battery and, consequently, the implantable defibrillator.

Heat treatment in air is one conventional method for reducing DC leakage and improving the quality of a dielectric oxide generated by an anodizing process. Heat treatment can be done after the anodizing process is completed, especially when relatively thick oxides (greater than about 100 nm in thickness) are desired, or as an intermediate step in an anodizing process. Heat treatment is also frequently used in conjunction with other coating deposition processes including reactive physical vapor deposition (RPVD), chemical vapor deposition (CVD), thermal oxidation, and oxygen plasma deposition. It is normally performed in air and at a temperature up to about 550° C. While the exact mechanism is not clear, heat treatment is believed to reduce oxygen vacancies and contamination in the oxide film, such as those caused by hydrogen, carbon and phosphorous.

Chang et al. in a publication titled "Improvement of Electrical and Reliability Properties of Tantalum oxide by High-Density Plasma (HDP) Annealing in $N_2O$"; IEEE Electron Device Letters, vol. 23, issue. 11, pp 643-45, 2002, describe another method for treating a dielectric oxide. They propose using high-density plasma annealing in $O_2$ and $N_2O$ on thin tantalum oxide films having a thickness of 10 nm or less deposited by chemical vapor deposition (CVD). Chang et al. write: "This study aims to improve the electrical characteristics and reliability of low-pressure chemical vapor deposited (LPCVD) tantalum pentoxide ($Ta_2O_5$) films by a new post-deposition annealing technique using high-density plasma (HDP). Experimental results indicate that excited oxygen atoms generated by $N_2O$ decomposition from HDP annealing can effectively reduce the carbon and hydrogen impurity concentrations and repair the oxygen vacancies in the as-deposited CVD $Ta_2O_5$ film, thereby resulting in a remarkable reduction of the film's leakage current. Two other post-deposition annealing conditions are compared: HDP 02 annealing and conventional plasma $O_2$ annealing. The comparison reveals that HDP $N_2O$ annealing has the lowest leakage current and superior time-dependent dielectric breakdown (TDDB) reliability." The problem is that oxide films deposited by chemical vapor deposition techniques as well as by physical vapor deposition (PVD) have poor stoichiometry and normally contain significant contamination. Either post deposition annealing in air or oxygen plasma treatment is needed to remove the contaminants and improve oxide stoichiometry.

Unlike films produced by CVD and PVD techniques, an oxide film, such as of tantalum oxide, formed by anodizing is believed to have nearly perfect stoichiometry and contain relatively little contamination. Defects in tantalum oxide films that cause high DC leakage and oxide degradation are believed to be mostly due to oxygen vacancies that increase in density as the film thickness increases. While anodic oxide films also contain foreign species incorporated from the electrolytes during anodizing, certain electrolyte species such as phosphates at appropriate levels are believed to be beneficial to the film's stability and capacitor long-term performance.

While these conventional heat treatment methods give satisfactory results, they are not believed to completely rid the dielectric oxide of defects, especially those in relatively thick anodic oxides. Since oxide defects adversely impact DC leakage, among other characteristics, improvements here are important. This is nowhere more critical than when the capacitor is incorporated into an implantable medical device, such as an implantable cardioverter defibrillator, where fast charging and efficient charge/discharge are paramount. The present plasma treatment method is believed to be such an improvement.

SUMMARY OF THE INVENTION

Accordingly, the present invention is directed to an oxygen plasma process for treating anodic dielectric films subsequent to incorporation into electrolytic capacitors. The present plasma treatment process is particularly useful with thick films (greater than about 0.1 µm). While tantalum oxide is a preferred anodic film, the principles described herein are equally applicable to other anodic oxides of valve metals such as, but not limited to, those of aluminum, niobium, titanium, and zirconium.

In that respect, the purpose of the present invention is to improve the electrical properties of the dielectric layer, particularly for a tantalum anode provided with a dielectric of tantalum oxide by an anodizing process. In a broader sense, however, the present plasma treatment (conventional and high density plasma) process is useful in reducing defects in dielectric oxides in comparison to conventional treatment processes, regardless the process by which the oxide was formed. This, in turn, reduces capacitor DC leakage, increases capacitor charge/discharge energy efficiency, and improves long-term capacitor performance stability. These properties are critical for applications such as in an implantable cardioverter defibrillator where short charging time, high capacitor charge/discharge energy efficiency, and stable lifetime performance are strongly desired.

These and other aspects of the present invention will become increasingly more apparent to those skilled in the art by reference to the following description and the appended drawing.

DETAILED DESCRIPTION OF THE PREFERRED EMBODIMENTS

Figure 1:
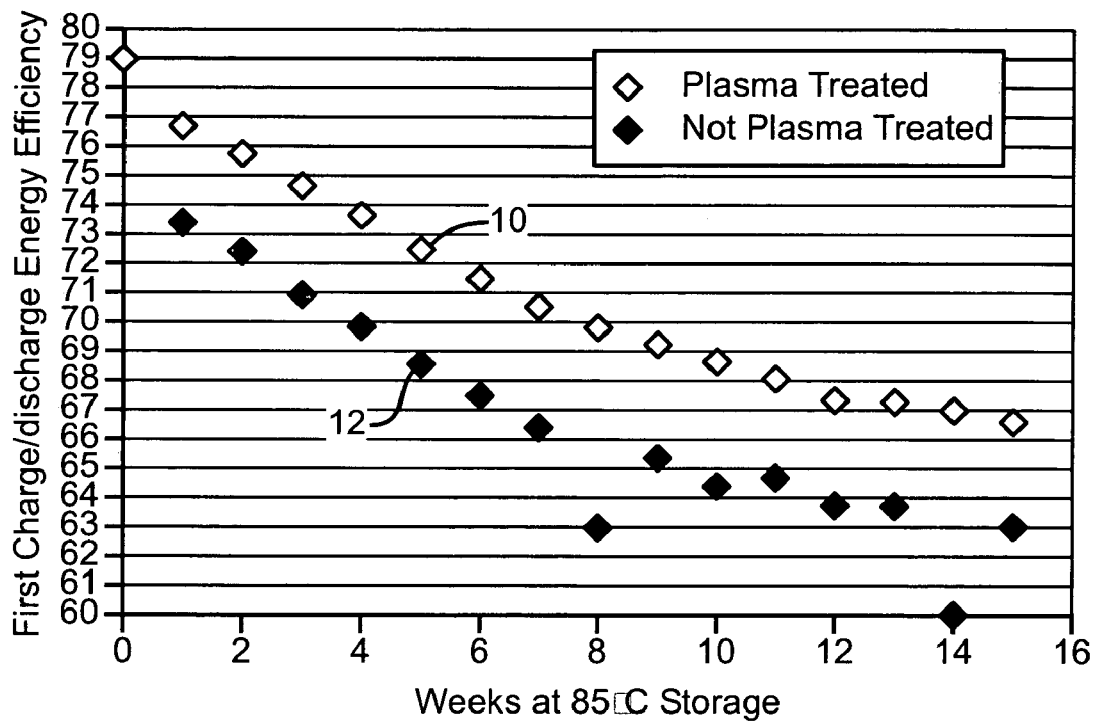
FIG. 1 is a graph constructed from accelerated life charge/discharge tests performed on electrolytic capacitors having tantalum anodes treated according to the present invention in comparison to those having untreated anodes.

The present invention is related to treatment of anodic oxides on valve metals for subsequent incorporation into electrolytic capacitors. Valve metals include, but are not limited to, tantalum, aluminum, niobium, titanium, zirconium, and alloys thereof. The valve metal can be in the form of a foil (etched or un-etched), pressed and sintered powder pellet or another porous structure. For a tantalum electrolytic capacitor, the tantalum anode is typically in the form of a pressed/sintered tantalum powder pellet. Beam melt, sodium reduction, or other processes produce the tantalum powder. Regardless of the process by which the valve metal powder is processed, however, pressed valve metal powder structures, and particularly tantalum pellets, are typically anodized to a desired target formation voltage in an appropriate formation electrolyte.

One commercial production process is to attach the anodes to a carrier bar, which, in turn, is supported by a carrier framework. The anodes are immersed in the anodizing electrolyte and an essentially flat cathode surface is supported around them without touching the anode bodies. The cathode surface may be any suitable conductive material including, but not limited to, tantalum sheet, stainless steel sheet, perforated stainless steel sheet, stainless steel wire mesh, Alloy 20Cb3, platinum, gold, and combinations thereof.

For an anode used in an electrolytic capacitor, anodizing the valve metal in an aqueous or solvent based electrolyte containing solutes such as phosphoric acid, boric acid, carboxylic acids, or their ammonium or amine salts forms the oxide. Anodizing tantalum is normally done in an electrolyte containing phosphoric acid or its salts. For formation of a high voltage tantalum oxide, glycol or polyalkylene glycol or other solvents are often added to increase the formation (anodizing) voltage. Exemplary formation electrolytes consist of ethylene glycol or polyethylene glycol, de-ionized water and $H_3PO_4$ having a conductivity of about 2,500 µS to about 2,600 µS at 40° C. Another is an aqueous solution of $H_3PO_4$ having conductivity up to about 20,000 µS at 40° C.

Conventional practice for low voltage oxide anodization has been to form the valve metal to a target formation voltage at a constant current. The formation current depends on the electrolyte composition, the valve metal powder type and the size of the valve metal body. Adjusting these parameters is well within the knowledge of those skilled in the art. For high voltage formation (thicker oxide), the current and voltage profiles need to be adjusted during anodizing for better formation yield and oxide quality.

A preferred method for anodizing a high voltage tantalum anode is described in U.S. Pat. No. 6,231,993 to Stephenson et al., which is assigned to the assignee of the present invention and incorporated herein by reference. In this improved process, a valve metal pellet is periodically held at a constant voltage and the current is allowed to decay over a period of time, or the formation power supply is periodically turned off altogether during the anodization process. Either way provides an opportunity for heated electrolyte to diffuse from the anodized pellet. The formation current is reduced as the formation voltage (oxide thickness) increases. This makes high voltage (thicker oxide) formation possible with good production yield and good oxide quality.

Regardless the anodizing process employed, anodic valve metal dielectric oxides, especially those having a thickness greater than about 100 nm, contain defects that affect DC leakage and stability of the dielectric oxide. These defects are believed to be mostly due to oxygen vacancies. The present invention is directed to an oxygen plasma process for treating anodic dielectric oxides. The plasma process can be of both a conventional type having an oxygen density of about $10^9$ ions/cm$^3$ to about $10^{10}$ ions/cm$^3$ or a high density process having an oxygen density of about $10^{11}$ ions/cm$^3$, or greater. The plasma gases are preferably in the form of either $O_2$ or $N_2O$. This is for the purpose of supplying oxygen to the dielectric oxide to diminish, if not entirely eliminate, oxygen vacancies. The consequence is improved capacitor DC leakage and long-term performance stability.

The plasma treatment can be applied to other dielectric oxide films deposited by other techniques. The primary focus, however, is dielectric oxides provided on a valve metal by an anodizing process. The treated body is subsequently useful as an anode in an electrolytic capacitor. Effective plasma treatment depends on a number of factors including substrate temperature, plasma power, plasma treatment time, gas pressure, and distance between the plasma source and the valve metal body being treated. The plasma treatment can be carried out at a substrate temperature ranging from ambient to about 500° C., preferably less than about 300° C., and more preferably less than about 225° C. Exposure time for the valve metal body to the plasma preferably ranges from about 1 minute to a few hours, primarily depending on size of the body.

The following examples describe the manner and process of the present invention, and they set forth the best mode contemplated by the inventors of carrying out the invention, but they are not to be construed as limiting.

EXAMPLE I

A plurality of pressed powder tantalum pellets served as test bodies. They were sintered tantalum powder pellets having an anodically formed tantalum oxide layer about 0.43 μm thick. The pellets are of the type incorporated into tantalum electrolytic capacitors commercially available from Wilson Greatbatch Technologies, Inc., the assignee of this invention.

Plasma treatment was done in a high-density oxygen plasma chamber. Inductive coupling at 380 kHz RF and 2500 W power supply generated the high-density plasma. The oxygen plasma chamber was maintained at about 0.5 to about 50 mTorr with an ion density of about $10^{11}$ ion/cm$^3$ to about $10^{12}$ ion/cm$^3$. The anodized tantalum bodies were oxygen plasma treated at various substrate temperatures up to 300° C. with the plasma power ranging from about 500 watts to about 1100 watts. Exposure times ranged from about 1 minute to about 10 minutes. Detailed experimental conditions are shown in Table 1.

After plasma treatment, the tantalum pellets each served as the anode in a tantalum electrolytic capacitor. The cathode was ruthenium oxide coating on a titanium sheet substrate and the working electrolyte consisted of, by weight, about 47.6% water, about 25.0% ethylene glycol, about 13.3% acetic acid, about 13.4% ammonium acetate, about 0.4% phosphoric acid, and about 0.3% p-nitrophenol. All of the capacitors had a 215-volt rated working voltage.

Similarly constructed capacitors were built except that the tantalum anodes were untreated. This means the tantalum pellets were not subjected to the present plasma treatment process subsequent to being anodized to the target formation voltage in an electrolyte. Instead, they were taken from the formation electrolyte, rinsed with deionized water, dried, heat treated in air, reformed, rinsed and dried again, and then incorporated into an electrolytic capacitor having a ruthenium oxide cathode.

Tables 1 and 2 compare the DC leakage of these 215-volt rated capacitors. Table 1 shows the results of the capacitors containing anodes treated with high-density oxygen plasma according to the present invention while Table 2 lists the untreated ones. The listed DC leakage values are the readings at five-minutes and were measured at rated voltage (215 V) at a test temperature of 37° C. The optimal treatment conditions are having the tantalum pellet at about 200° C. subjected to a plasma power of about 500 watts for about 5 minutes.

TABLE 1

Plasma Treated Anodes

| Anode No. | Treatment Conditions Watts/° C./Min. | DC Leakage, μA |
|---|---|---|
| 1 | 500/100/1 | 36.98 |
| 2 | 500/100/1 | 36.11 |
| 3 | 500/100/5 | 36.58 |
| 4 | 500/100/5 | 38.22 |
| 5 | 500/200/3 | 37.09 |
| 6 | 500/200/3 | 38.17 |
| 7 | 500/300/1 | 41.12 |
| 8 | 500/300/1 | 41.09 |
| 9 | 500/300/5 | 38.11 |
| 10 | 500/300/5 | 36.71 |
| 11 | 850/100/3 | 39.55 |
| 12 | 850/100/3 | 37.66 |
| 13 | 850/200/5 | 32.72 |
| 14 | 850/200/5 | 39.56 |
| 15 | 850/200/1 | 38.31 |
| 16 | 850/200/1 | 37.14 |
| 17 | 1100/100/1 | 37.75 |
| 18 | 1100/100/1 | 37.93 |
| 19 | 1100/300/1 | 42.00 |
| 20 | 1100/300/1 | 43.40 |
| 21 | 1100/25/5 | 45.80 |
| 22 | 1100/25/5 | 43.70 |

TABLE 2

Untreated Anodes

| Anode No. | DC leakage, μA |
|---|---|
| C1 | 69.17 |
| C2 | 68.76 |
| C3 | 58.87 |
| C4 | 66.34 |
| C5 | 68.76 |
| C6 | 58.54 |
| C7 | 68.77 |
| C8 | 66.93 |
| Average | 65.81 |

It is readily apparent that the capacitors built with plasma treated anodes had significantly less DC leakage than the capacitors with untreated anodes.

EXAMPLE II

The capacitors used to create Tables 1 and 2 were further subjected to an accelerated life test. This was done by storing them at 85° C. without bias and then performing a charge/discharge test weekly at 37° C. Charging the individual capacitors at a constant current of 10 mA to the rated voltage of 215 V and subsequently discharging them through a load resistor of about 17 ohms provided the average charge/ discharge energy efficiency values shown in FIG. 1. The charge/discharge energy efficiency is the total energy delivered during discharging divided by the total energy put in during charging. The treated anodes were those subjected to $O_2$ plasma having an ion density of about $10^{11}$ ion/cm$^3$ to about $10^{12}$ ions/cm$^3$ at 500 watts, 203° C. for 4 minutes. This accelerated life test is typically used in evaluating capacitors for implantable cardioverter defibrillators The curve labeled 10 in FIG. 1 was constructed from the capacitors containing the plasma treated anodes while the curve labeled 12 was constructed from the capacitors containing untreated anodes. From the graph, it can be seen that the plasma treated anodes are more stable than the untreated ones.

CONCLUSION

The superior performance of oxygen plasma treated valve metal anodes in comparison to conventional heat treated anodes is believed due to excited oxygen atoms in the plasma (oxygen or $N_2O$) being more effective in penetrating the dielectric oxide layer to fill the oxygen vacancy defects and removing contamination (carbon and hydrogen) therein. Furthermore, oxygen plasma treatment is relatively fast and more efficient in reducing oxide defects than conventional heat treatment methods. It results in a dielectric oxide having lower DC leakage and that is more stable during shelf and operation life than an untreated dielectric oxide.

It is appreciated that various modifications to the present inventive concepts described herein may be apparent to those of ordinary skill in the art without departing from the spirit and scope of the present invention as defined by the herein appended claims.

What is claimed is:

1. An anode for incorporation into a capacitor, the anode comprising:
   a) a valve metal;
   b) a dielectric oxide layer provided on the valve metal, wherein the dielectric oxide is characterized as having first been formed by anodizing the valve metal in an electrolyte; and
   c) followed by treating the thusly formed dielectric oxide in a plasma process to reduce oxygen deficiencies therein.

2. The anode of claim 1 wherein the plasma process provides an oxygen ion density of at least about $10^9$ ion/cm$^3$.

3. The anode of claim 1 wherein the plasma gases are in the form of either $O_2$ or $N_2O$.

4. The anode of claim 1 wherein the plasma process is at a power of about 500 watts to about 1,100 watts.

5. The anode of claim 1 wherein the dielectric oxide layer is about 0.01 µm to about 2.0 µm thick.

6. The anode of claim 1 wherein the valve metal is selected from the group consisting of niobium, tantalum, aluminum, titanium, zirconium, and mixtures thereof.

7. The anode of claim 1 wherein the temperature of the plasma process ranges from ambient to about 500° C.

8. The anode of claim 1 wherein the dielectric oxide is exposed to the plasma process for a time ranging from about one minute to a few hours.

9. An anode for incorporation into a capacitor, the anode comprising:
   a) a tantalum body;
   b) a dielectric tantalum oxide layer provided thereon, wherein the dielectric oxide is characterized as having first been formed by anodizing the valve metal in an electrolyte; and
   c) following by treating the thusly formed dielectric oxide in a plasma process to reduce oxygen deficiencies therein.

10. Te anode of claim 9 wherein the dielectric tantalum oxide layer has a thickness of about 0.1 µm or more.

11. A process to form an anode for a capacitor, comprising the steps of:
    a) providing a valve metal;
    b) first forming a dielectric oxide layer on a surface of the valve metal; and
    c) then exposing the dielectric oxide layer to a plasma process to reduce oxygen deficiencies therein.

12. The process of claim 11 including providing the plasma process having an oxygen ion density of at least about $10^9$ ion/cm$^3$.

13. The process of claim 11 including providing a plasma gas in the form of either $O_2$ or $N_2O$.

14. The process of claim 11 including performing the plasma process at a power of about 500 watts to about 1,100 watts.

15. The process of claim 11 including providing the dielectric oxide layer of a thickness ranging from about 0.01 µm to about 2.0 µm.

16. The process of claim 11 including selecting the valve metal from the group consisting of niobium, tantalum, aluminum, titanium, zirconium, and mixtures thereof.

17. The process of claim 11 including forming the dielectric oxide by a procedure selected from anodizing the valve metal in an electrolyte, physical vapor deposition, thermal oxidation, oxygen plasma deposition, and combinations thereof.

18. The process of claim 11 including providing the temperature of the plasma process ranging from ambient to about 500° C.

19. The process of claim 11 including exposing the dielectric oxide to the plasma process for a time ranging from about one minute to a few hours.

* * * * *

UNITED STATES PATENT AND TRADEMARK OFFICE
CERTIFICATE OF CORRECTION

| | |
|---|---|
| PATENT NO. | : 7,286,336 B2 |
| APPLICATION NO. | : 11/128849 |
| DATED | : October 23, 2007 |
| INVENTOR(S) | : Liu et al. |

It is certified that error appears in the above-identified patent and that said Letters Patent is hereby corrected as shown below:

Column 2, line 61, delete "02" and insert --$O_2$--.

Column 7, line 8, delete "defibrillators" and insert --defibrillators.--.

Column 7, line 8, "The curve labeled" should be the beginning of a new paragraph.

Signed and Sealed this

Third Day of August, 2010

David J. Kappos
*Director of the United States Patent and Trademark Office*